United States Patent [19]

Gerlach et al.

[11] 4,332,686

[45] Jun. 1, 1982

[54] LINEAR POLYURETHANE ULTRAFILTER AND PROCESSES FOR USE THEREOF

[75] Inventors: Klaus Gerlach, Obernau; Joachim Behnke, Amorbach; Wolfgang Rösener, Erlenbach; Ewald Hohm, Mömlingen, all of Fed. Rep. of Germany

[73] Assignee: Akzo N.V., Arnhem, Netherlands

[21] Appl. No.: 145,767

[22] Filed: Apr. 30, 1980

[30] Foreign Application Priority Data

May 4, 1979 [DE] Fed. Rep. of Germany ....... 2918027

[51] Int. Cl.$^3$ ...................... B01D 13/00; B01D 39/16
[52] U.S. Cl. .................................. 210/651; 210/708; 210/799; 210/500.2
[58] Field of Search ................ 204/296; 429/253, 254; 528/65, 66, 76, DIG. 904; 210/637, 650, 651, 708, 799, DIG. 5, 500.1, 500.2; 55/158; 428/218, 220; 208/187; 252/322, 349

[56] References Cited

U.S. PATENT DOCUMENTS 3,615,024 10/1971 Michaels ............................ 210/490
3,855,133 12/1974 Roehsler ...................... 210/500.2 X
4,042,576 8/1977 Eustache ......................... 210/651 X
4,148,734 4/1979 Hilterhaus et al. .............. 210/500.2

FOREIGN PATENT DOCUMENTS 2409789 9/1975 Fed. Rep. of Germany ........ 528/76

OTHER PUBLICATIONS

Berger, S. E. et al., "High-Performance Toluene Diisocyanate-Polypropylene Glycol...", Itec Product Research and Development 3;129 (1964).
Muir, W. M. et al., "Comparative Membrane Ultrafiltration Rates", Med. and Biol. Engng., vol. 8, pp. 395–402, Pergamon Press, 1970.
Mason, N. S. et al., "Cellulose Acetate Dialysis Membranes" in Advances in Bioengineering, No. 114, vol. 67, 1971, Am. Inst. of Chem. Engineers.

*Primary Examiner*—Charles N. Hart
*Assistant Examiner*—David R. Sadowski
*Attorney, Agent, or Firm*—Michael J. Striker

[57] ABSTRACT

An ultrafiltration membrane comprised of a linear polyurethane having a hydraulic permeability for water of about 50 to 500 $1/m^2 \cdot h$ and a separation factor $\alpha$ of about $2 \times 10^{-3}$ to $1 \times 10^{-4}$, the permeability being based on determination with a membrane of a thickness of about 0.02 mm, a pressure differential of 1 bar and a temperature of 20° C. and the separation factor $\alpha$ being established with a 2% oil-water emulsion at 25° C. The membrane is particularly suited for operation of oil-water mixtures or emulsions.

14 Claims, No Drawings

LINEAR POLYURETHANE ULTRAFILTER AND PROCESSES FOR USE THEREOF

BACKGROUND OF THE INVENTION

The invention relates to an ultrafiltration membrane of linear polyurethane which has a high hydraulic permeability and a high separation capacity. It also comprises a process for making the membrane and a process for using the membranes in order to separate oil from an oil-water emulsion or to bring up the concentration of oil present in an oil-water emulsion.

Ultrafiltration is a separation process in which a dissolved or emulsified material is withdrawn from a solution or emulsion which contains the dissolved or emulsified material which latter has a larger molecular dimension than the solvent. The separation is effected by subjecting the solvent or emulsion during its passage across the surface of a semipermeable membrane to a pressure which forces the solvent to permeate the membrane.

The term "ultrafiltration" is mainly used to describe pressure activated separations in which a material of a molecular weight of 500 or more is separated from the solvent.

Ultrafiltration membranes have been described in a number of patents and other literature of the art. References have also been made in the literature to the use of polyurethanes for making foils and membranes. However, these membranes either had substantial shortcomings or were not particularly suited for ultrafiltration purposes. Thus, Lyman in Academic Sciences 146 (1) 113-8 (1968) describes a synthetic membrane for the hemodialysis. In this publication there has been made mention also of polyurethane which can be used for making the membranes. This type of membrane has, however, a high sensitivity to water, in addition has very poor mechanical properties and is unsuited for ultrafiltration.

In the French Pat. No. 1,355,577 numerous polyurethanes have been described which are supposed to be suited for making microporous foils or films which have an excellent steam permeability. These foils or coatings are, however, exclusively used in making synthetic leather and are entirely useless for ultrafiltration purposes.

In the German accepted application No. 1,794,191 anisotropic microporous polymeric low pressure membranes are described which may also be made for polyurethane. This application, however, does not include any specific reference to the composition or structure of these polyurethanes.

In the German published application No. 2,627,629 membranes made of polyurethanes are described which are intended for the separation of aromatic hydrocarbons from aliphatic hydrocarbons, cycloaliphatic hydrocarbons and other aliphatic compounds. The separation of the aromatic hydrocarbons is carried out in a process which is named "pervaporation". According to the statements in this application all polyurethanes are practically suitable for this type of membrane. Specific references to polyurethanes which might be useful for making ultrafiltration membranes, however, are not found in this application.

Although, therefore, quite a number of ultrafiltration membranes have been known there is still a need for improved membranes which can be used for different purposes and can be manufactured in simple processes.

It is therefore an object of the present invention to provide for an ultrafiltration membrane which can be made in a simple way from linear polyurethanes, and, in addition, have a high hydraulic permeability and a high retention capacity.

Another object of the invention is to provide for ultrafiltration membranes which can be used in a broad pH range, which exhibit their separation action within a broad temperature range and which can furthermore withstand comparatively high pressure without being torn.

An object of the invention is furthermore to provide for ultrafiltration membranes of polyurethane which have a high resistance to clogging, which can be used for many different purposes and permit in particular to separate oil from oil-water mixtures even though the oil may be emulsified in the water which is the case where the oil-contaminated water contains additionally detergents which, as is well known today, make the separation of oil and other contaminations extremely difficult. A further object of the invention is to provide ultrafiltration membranes useful for separating and concentrating water which contains fats or fatty oils as it occurs particularly in the food and feed industry.

ESSENCE OF THE INVENTION

The ultrafiltration membrane of the invention is composed of linear polyurethanes having a hydraulic permeability for water of about 50 to 500 $1/m^2 \cdot h$ and a separation factor $\alpha$ between about $2 \times 10^{-3}$ and $1 \times 10^{-4}$. The permeability is measured with a membrane of a thickness of about 0.020 mm, at a pressure difference of 1 bar and a temperature of 20° C. The separation factor is determined with a 2% oil-water emulsion of 25° C.

The hydraulic permeability preferably is between 200 and 400 $1/m^2 \cdot h$. The linear polyurethane preferably should have a mean molecular weight of about 100,000 to 1,000,000 and is the reaction product of 20 to 80% by weight of polyethylene and 80 to 20% by weight of ethylene glycol and diphenylmethane diisocyanate. Preferred is the reaction product of 30 to 40% by weight of polyethylene glycol and 70 to 60% by weight of ethylene glycol and diphenylmethane diisocyanate. The polyethyleneglycol preferably has a mean molecular weight between 200 and 20,000. Particularly suitable is a polyethylene glycol with a mean molecular weight of 1,000 to 6,000.

In a preferred embodiment the ultrafiltration membrane is composed of a linear segmented polyurethane which is obtained by a reaction in which the NCO groups of the diisocyanate and the OH groups of the polyethylene glycol and the ethylene glycol are reacted in a stoichiometrically equivalent ratio. The linear segmented polyurethane preferably has a molar ratio of hard segment to soft segment of between 2:1 and 60:1, particularly between 9:1 and 15:1. The terms "hard segment" and "soft segment" will be explained further below.

In another preferred embodiment the ultrafiltration membrane is characterized by an upper and a lower surface portion of a thickness of about 10 to 40 nm, an intermediate portion and elongated pear-shaped cavities which are substantially vertically disposed relative to the surface areas, which are tapered towards the surfaces and which have a shape rounded off towards the intermediate portion. Highly useful are ultrafiltration membranes of a thickness of 0.001 mm to 0.20 mm, preferably between 0.0015 and 0.100 mm.

PROCESS OF MAKING

To make the ultrafiltration membranes of the invention a process is preferred wherein polyethylene glycol of a mean molecular weight of between 200 and 20,000 in an amount of 20 to 80% relative to the weight of the other reaction partners is reacted with diphenylmethane diisocyanate, using ethylene glycol as chain extender. The reaction is carried out in solution and the final product is the polyurethane. After reaching a viscosity between 0.5 and 30 Pa.s (pascal×sec.) relative to a polyurethane concentration of 15%, the chain growth is terminated by a chain stopper and, if desired, a stabilizing agent. The mixture obtained is subject to precipitation, shaping and washing and the thus formed membrane may then be subjected to drying.

The mixture can be extruded into the precipitation bath. The mixture can, however, also be formed into a membrane on a porous carrier. Preferably, solutions are used with a polymer proportion between 5 and 30% by weight, particularly between 10 and 20% by weight.

As the precipitation bath, water may be used at a temperature between 0° and 50° C. As the solvent, dimethylacetamide is preferred.

It is advisable to react the polyethylene glycol, ethylene glycol and diphenylmethane diisocyanate in equimolar ratio. The polyethylene glycol which is the building block for the soft segment is preferably used in a molar ratio relative to the hard segment of between 1:2 and 1:60, preferably between 1:9 and 1:15.

Prior to drying, the membrane may be subjected to a pretreatment in an immersion bath. It is preferred to use water in this bath which contains a pore filler for which latter purpose particularly polyhydric alcohols are suited.

DETAILS OF THE INVENTION

The membranes of the invention are useful particularly for the separation of oil from water for separation and concentration treatments of fat-containing waters and for the concentration of oil-containing waters such as bilge water and drilling and cutting oils, etc.

For the purposes of the invention the hydraulic permeability which is frequently also called the "ultrafiltration performance" is expressed as one liter of permeating water per square meter of membrane surfaces in a time of 1 hour and at a pressure differential of 1 bar. The determination is effected with pure, that is distilled or preferably completely desalted water at a temperature of 20° C. and a membrane of a thickness of about 0.020 mm.

To determine the hydraulic permeability the membrane is placed on a suitable substrate, for instance a filter plate as they are sold by the Millipore Company of Neu-Isenburg under the catalog number YY30.090.00 and the water is forced through the membrane with the pressure indicated. The water passes through the membrane at predetermined time intervals.

Precision measurements may be carried out according to a procedure laid down in the factory code 780/185c of the Enka Corporation of Wuppertal, West Germany, which was prepared for examining dialysis flat membranes as they are made by the Enka Corporation from regenerated cellulose and as are sold under the trademark "Cuprophan".

In this factory code the flow-through amount was established at a pressure differential of 0.6 bar since a pressure differential of 1 bar is too high to be used in a laboratory device.

Since the flow-through amounts increase in linear proportion with the pressure differential in the pressure differential area of 0.3 to 2.0 bar it is possible to determine the linear development by means of one or several measurements and to accept for further specimen examinations with a measurement at 0.6 bar from which, by means of the factor determined from the above measurements the hydraulic permeability at a pressure difference of 1 bar can be computed.

The separation factor $\alpha$ is a measure for the separation capacity of the membrane during ultrafiltration. It is computed according to the following formula $$\alpha = (c_{Af}/c_{Bf})/(C_{Ag}/C_{Bg})$$

In the area of lower concentrations the equation $\alpha = c_{Af}/c_{Ag}$ may be used. In these equations $c_{Af}$ or $c_{Bf}$ indicate the concentrations of the materials A and B in the filtrate and $c_{Ag}$ and $c_{Bg}$ indicate the concentration in the mixture to be separated, A being the material to be separated out and B being the main component, usually water.

The factor $\alpha$ is determined for the invention with a 2% oil/water emulsion. To prepare this emulsion a mineral oil is used which is obtainable from the Shell Company of West Germany under the trademark "Ondina 33" and using an emulsifier on the basis of polyoxyethylene sorbithexaoleate as obtainable from the Atlas Chemie Company of Essen, West Germany, under the tradename "Atlas G1086A". "2% oil/water" emulsion indicates an emulsion of 2 parts of a mixture of equal parts of mineral oil and emulsifier and 98 parts water hereafter refered to in the instant claims and specification as the standard 2% oil-and-emulsifier in water emulsion.

The determination of the concentrations of these contaminations in the water is effected by customary IR-spectroscopic analysis procedures.

The linear polyurethanes can be made by conventional methods as practiced in the polyurethane chemistry. The reaction is carried out in a conventional solvent which must not react with the reaction partners and in which the formed polyurethanes must likewise be soluble. Examples, for instance, are dimethylformamide and particularly dimethylacetamide.

The reaction can be carried out in a two-stage process in which first a preliminary adduct is formed from the polyethyleneglycol and an excess of diphenylmethanediisocyanate. The adduct is then subjected to a lengthening of the chain by ethyleneglycol. Preferably the reaction is carried out in a single reaction vessel in which all of the starting products are subjected to dissolution.

A suitable process for making the linear polyurethanes used in the present invention is described in the German published application No. 2,409,789. As chain stoppers there may be used a monobasic alcohol, particularly methanol or ethanol. As stabilizing agents there may be used the conventional compounds such as salicilic acid or nitrilotriacetic acid and others.

What has been called herein the "soft segment" of the polyurethanes is intended to refer to the segments in the linear chain of the molecule which are formed from the building block polyethylene glycol. The term "hard segment" refers to the segment which is formed by the reaction of diphenylmethanediisocyanate and ethylene glycol. The hard segment in this terminology may be called also the building block formed by diphenylmethanediisocyanate molecules which reacted by way of one NCO-group with the polyethylene glycol and through the other NCO-group with an ethylene glycol molecule. This may still be called a hard segment.

The shaping of the solution can be effected by conventional methods such as casting, spreading, blade wiping or extruding by means of a tool such as a slotted nozzle. Highly useful is a process in which the mixture is formed to a membrane on a porous carrier. This can be effected by blade-wiping the solution onto a porous substrate such as paper or similar. Particularly suitable as porous substrate, that is as membrane carriers, are foils having a porous surface such as they have been described in the German patent application No. P 28 33 623.4 of July 31, 1978.

The precipitation of the polyurethane is effected with a conventional precipitating agent, for instance with a solvent which has been heavily diluted with a non-solvent so that the polyurethane is no longer soluble therein. An example, for instance, is a dimethylacetamide-water mixture. The precipitation can, however, also be effected directly with the non-solvent in which case water is particularly suitable. If the precipitation is carried out only from one phase of the formed solution a so-called asymmetric membrane is obtained. A similar asymmetry can also occur if the polyurethane is precipitated while it is disposed on a carrier.

A suitable process is furthermore the extrusion into a precipitation bath like water at a temperature of 0° to 50° C. The residual solvent is removed after the precipitation by washing and the membrane can then be directly used while still moist or after drying or it may be passed to storage or shipping.

If the membrane is dried it is advisable to subject it while still moist to a pretreatment in an immersion bath. This bath may contain conventional pore fillers, particularly polybasic alcohols, like glycerine.

The structure of the membrane which has a bottom and a top surface portion of a thickness of about 10 to 40 nm, is characterized by an intermediate portion which extends about parallel and at an even thickness between the pear-shaped cavities above referred to. The intermediate area may, however, be also in folded form or may extend in meandering form between the upper and lower pear-shaped cavities. The structure form can be modified by the conditions of the precipitation, the concentration of the polyurethane solution and the chemical structure of the polyurethane.

It has been in particular surprising that by means of the invention ultrafiltration membranes can be formed which have already at a relatively moderate pressure of, for instance, 2 bar and lower, a high hydraulic permeability for water and exhibit excellent separation properties. In addition the membranes of the invention can also withstand considerably higher pressures.

The separation effect of the ultrafiltration membranes of the invention is characterized by the fact that the retention limits for the different materials, particularly for the oil, are precisely marked so that practically a quantitative separation, for instance of oil from oil-water mixtures is possible even though the oil may be present only in extremely small amounts or in the form of an emulsion which, as noticed, is the case if the water in addition to the oil contains other contaminants such as detergents. The oil contents can thus be reduced to less than 10, for instance to 5 ppm.

The ultrafiltration membrane of the invention has a high chemical resistance and a high anticlogging strength.

The membrane may have both a symmetrical and an asymmetrical structure. This means that it is possible to form membranes which have a dense separating skin-like polymer coating only on one side and are formed below that surface layer of a structure which has considerably larger pores. This will permit the solvent to simpy flow out of the structure without any great resistance after the solute has been separated.

The membranes have also good mechanical properties permitting the use in highly different devices. They are easily dried and are therefore more suited for shipping than the membranes which must be stored in moist condition and which can be shipped only in sealed containers in which the liquid such as water forms an added ballast.

The present membranes do not require a special service such as periodic cleansing. They are, therefore, useful because of their inexpensive manufacturing methods as a disposable article.

Problems caused by fouling of the membranes do not occur. Service problems are practically non-existent.

The reference to fouling in this case is understood to apply to a phenomenon wherein during extended use cultures of bacteria form in the membrane which may constitute a risk requiring the removal of the bacteria by special treatment methods to avoid destruction of the membrane.

Since the membranes can be obtained with a constant pore volume and a constant pore distribution, they have reproducible properties. It was particularly unexpected that the membranes of the invention could be formed in extreme fineness. Thus, membranes may be made down to a thickness of 0.001 mm.

In addition, the membranes are useful for many purposes, such, as noted, for separating oil, like petroleum and similar products from oil-water mixtures. This can be done with the objective to obtain a biologically unobjectionable permeate. It is also possible to use the membrane of the invention for the treatment of drinking water. On the other hand, the membranes can also be used to increase the concentration of oil or fat-containing water with the objective to recover the oil. The oil of higher concentration can then be collected elsewhere for storage without the requirement to include in the shipments large amounts of water as ballast.

The membranes of the invention can further be used for the treatment of industrial sewage waters as they occur in various treatment processes. It is also possible to treat the discharge waters occuring in the textile industry and containing large amounts of sizing. Thus, the major part of the sizing may be recovered. The membranes of the invention can finally also be used for all treatment problems occurring in the food and feed industry and also in the pharmaceutical industry. They are particularly useful also in that area to treat fat and fatty oil-containing water.

The following examples will further illustrate the invention.

EXAMPLE 1

Making of the Polyurethane 171 g of polyethylene glycol with a molecular weight of 1,000 were passed into a three neck flask and were dehydrated on a steam bath for 30 minutes at 100° C. while being stirred in a pump vacuum. Subsequently, 70.8 g of ethylene glycol and 2,000 ml of distilled dimethylacetamide were added. The temperature was adjusted to 50° C. and nitrogen was introduced as a protective gas.

There were then added 90% of a solution obtained by dissolving 330 g diphenylmethane diisocyanate in 1,000 ml dimethylacetamide. The addition was effected while stirring at a temperature of 50°. Within 30 minutes the temperature rose to 70° C. The remainder of the diisocyanate solution was then slowly added until a viscosity of 4 Pa.s. had been reached. In case that this viscosity cannot be reached by the addition of the remaining 10% solution it is necessary to add an additional amount up to about 5% of the same solution of diphenylmethane diisocyanate. After the necessary viscosity had been reached the further chain growth was stopped by adding a solution of 30 ml ethanol in 100 ml dimethylacetamide. Subsequently a solution of 3 g of nitrilotriacetic acid in 10 ml dimethylacetamide was added as stabilizer. The homogeneous solution was then cooled while stirring and the excess of ethanol was removed at room temperature in a vacuum. The solution had a viscosity of 4 Pa.s. It was suitable for making the membranes.

EXAMPLE 2

Making of the polyurethane membranes

The homogeneous and degassified polyurethane solution obtained as described in Example 1 was forced from a supply vessel by means of a gear pump and through a filtration device into and through a slotted nozzle of which the slot had a length of 250 mm and a width of 100 μm.

The nozzle extended into a precipitation bath consisting of water. The precipitation took place directly beneath the nozzle slot. Provisions were made that the zone in the neighborhood of the nozzle was not disturbed by vortex formation. The membrane was withdrawn with a withdrawal speed of about 3.5 m per minute. The precipitation bath had a length of about 8 m. Fresh water was passed into the bath in countercurrent direction in order to remove as far as possible all dimethylacetamide from the membrane.

Along a second area of about the same length the residual dimethylacetamide was washed from the membrane. The resulting membrane had a width of about 20 cm and a thickness of about 25 μm. The thickness of the foil could be adjusted according to the performance of the device.

The membrane in still moist condition was then coiled on a synthetic reel. Prior to drying the membrane was at first passed through a pretreatment bath which consisted of 42.5% water, 42.5% ethanol and 15% butanediol. The membrane was then dried under tension to avoid any folds and was coiled in completely flat condition on the reel. The residence time in the pretreatment bath was about 2 min.

EXAMPLE 3

A membrane as formed in Example 2 was placed into a filtration unit and used for the ultrafiltration of a 2% oil-water emulsion corresponding to the above discussed standard 2% oil-and-emulsifier in water emulsion. The filtrate contained less than 5 ppm mineral oil which corresponds to a separation factor α below $5 \times 10^{-4}$.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An ultrafiltration membrane consisting essentially of a linear polyurethane, said membrane having a thickness of 0.001 mm to 0.200 mm, hydraulic permeability for pure water of about 50 to 500 $1/m^2 \cdot h$ and a separation factor α of about $2 \times 10^{-3}$ to $1 \times 10^{-4}$, the permeability being based on determination with a membrane of a thickness of about 0.02 mm, a pressure differential of 1 bar and a temperature of 20° C. and the separation factor α being established with the standard 2% oil-and-emulsifier in water emulsion at 25° C., said separation factor being defined as the ratio of the concentrations of oil to water in filtrate from the membrane divided by the ratio of the concentrations of oil to water in feed to the membrane.

2. The ultrafiltration membrane of claim 1, wherein the hydraulic permeability is between 200 and 400 $1/m^2 \cdot h$.

3. The ultrafiltration membrane of claim 1, which consists of a linear polyurethane with a mean molecular weight of between 100,000 and 1,000,000 and which is obtained by reacting 20 to 80% by weight of polyethylene glycol with 80 to 20% by weight of a combination ethylene glycol and diphenylmethane diisocyanate.

4. The ultrafiltration membrane of claim 3 wherein the linear polyurethane is the reaction product of 30–40% by weight of polyethylene glycol with 70–60% by weight of a combination of ethylene glycol and diphenylmethane diisocyanate.

5. The ultrafiltration membrane of claim 3 wherein a polyethylene glycol is employed having a mean molecular weight of between 200 and 20,000.

6. The ultrafiltration membrane of claim 5 wherein the polyethylene glycol has a mean molecular weight between 1,000 and 6,000.

7. The ultrafiltration membrane of claim 3, wherein the linear polyurethane includes a soft segment formed by the polyethylene glycol and a hard segment formed by the reaction product of the diphenylmethane diisocyanate with the ethylene glycol, the molar ratio of the hard segment to the soft segment in the polyurethane being between 2:1 and 60:1.

8. The ultrafiltration membrane of claim 7, wherein the molar ratio of hard segment to soft segment is between 9:1 and 15:1.

9. The ultrafiltration membrane of claim 1, wherein the linear polyurethane is a segmented polyurethane obtained in a reaction in which NCO-groups of diisocyanate and OH-groups of a combination of polyethylene glycol and of ethylene glycol are reacted in a stoichiometrically equivalent ratio.

10. The ultrafiltration membrane of claim 1 which has an upper surface portion, a lower surface portion and an intermediate portion, the surface portions each having a thickness between about 10 to 40 nm and which includes elongated pear-shaped cavities which extend substantially vertically relative to said surface portions and are tapered toward said intermediate portion and which have a substantially rounded shape in the neighborhood of said intermediate portion.

11. The ultrafiltration membrane of claim 10 which has a thickness of 0.015 to 0.100 mm.

12. A process for the separation of an oil-water emulsion comprising passing the emulsion against an ultrafiltration membrane as defined in claim 1 at a pressure differential of at least 1 bar so as to cause the water to permeate the membrane followed by recovering the retentate in the form of oil.

13. The process of recovering fats from fats containing water or obtaining water purified of fats contained therein comprising passing the fats containing water against an ultrafiltration membrane as defined in claim 1 at a pressure differential so as to separate the fat from the water and recovering the fats in the form of the retentate or the permeated water as the filtrate or both.

14. The process of concentrating the oil in an oil-water emulsion occurring in bilge water, drilling oils or cutting oils comprising passing the oil-water emulsion against an ultrafiltration as defined in claim 1 so as to separate the oil or a substantial portion thereof from the water and recovering the oil as the retentate in concentrated form.

* * * * *